United States Patent [19]

Borland et al.

[11] Patent Number: 5,534,194
[45] Date of Patent: Jul. 9, 1996

[54] THICK FILM RESISTOR COMPOSITION CONTAINING PYROCHLORE AND SILVER-CONTAINING BINDER

[75] Inventors: William Borland; Keiichiro Hayakawa, both of Kanagawa-Ken; Takeshi Sato, Tokyo-To; Jerome Smith, Kanagawa-Ken, all of Japan

[73] Assignee: E. I. Du Pont de Nemours and Company, Wilmington, Del.

[21] Appl. No.: 540,807

[22] Filed: Oct. 11, 1995

Related U.S. Application Data

[63] Continuation of Ser. No. 245,885, May 19, 1994, abandoned, which is a continuation of Ser. No. 52,426, Mar. 30, 1993, abandoned.

[51] Int. Cl.$^6$ .................................................. H01B 1/08
[52] U.S. Cl. ..................... 252/518; 252/519; 252/521; 106/1.25
[58] Field of Search ..................... 252/514, 518, 252/519, 521; 106/1.25

[56] References Cited

U.S. PATENT DOCUMENTS

| | | | |
|---|---|---|---|
| 3,896,055 | 7/1975 | Bouchard et al. | 252/518 |
| 4,160,227 | 7/1979 | Ikegami et al. | 252/514 |
| 4,302,362 | 11/1981 | Hoffman et al. | 252/518 |
| 4,312,770 | 1/1982 | Yu et al. | 252/518 |
| 4,603,007 | 7/1986 | Shibata et al. | 252/514 |
| 4,711,835 | 12/1987 | Dufour | 430/314 |
| 5,162,062 | 11/1992 | Carroll et al. | 148/24 |
| 5,244,601 | 9/1993 | Burckhardt et al. | 252/518 |

FOREIGN PATENT DOCUMENTS

A0416525  9/1990  European Pat. Off. .

OTHER PUBLICATIONS

Patent Abstracts of Japan, vol. 15, No. 348 (E-1107) 4 Sep. 1991 & JP-A-03 134 905 (Showa Denko) 7 Jun. 1991.

*Primary Examiner*—Paul Lieberman
*Assistant Examiner*—M. Kopec

[57] ABSTRACT

A thick film resistor composition with a low length effect of TCR is provided. The thick film resistor composition containing at least one of an oxide of ruthenium and a ruthenium pyrochlore oxide as a conducting component, characterized in that the composition having 0.02–5.0 wt. % of silver incorporated therein.

4 Claims, No Drawings

THICK FILM RESISTOR COMPOSITION CONTAINING PYROCHLORE AND SILVER-CONTAINING BINDER

This is a continuation of application Ser. No. 08/245,885 filed May 19, 1994, now abandoned, which application is a continuation of Ser. No. 08/052,426, filed Mar. 30, 1993, now abandoned.

FIELD OF INVENTION

The present invention relates to a thick film resistor composition containing an oxide of ruthenium and/or a ruthenium pyrochlore oxide as a conducting component and more particularly to a thick film resistor composition which is used in combination with a Pd/Ag electrode or an Ag electrode.

BACKGROUND OF THE INVENTION

A thick film resistor composition widely used in thick film resistor electrical parts, thick film hybrid circuits, etc. is a composition for forming a resistor thick film by printing the composition on a conductor pattern or an electrode formed on the surface of an insulating substrate, and then calcining the print.

The thick film resistor composition is prepared by dispersing a conducting component and an inorganic binder in an organic medium (vehicle). The conducting component plays a principal role of determining the electrical properties of the thick film resistor, and a ruthenium oxide or the like is used as this component. The inorganic binder comprises glass, and has a major role of retaining the thick film integrally and binding it to the substrate. The organic medium is a dispersing medium that affects the application properties, particularly theology, of the composition.

When a thick film resistor composition is to be used for a hybrid microelectronic circuit or a chip resistor, it is important that the electric stability of the resistor be high, and especially changes in the temperature coefficients of resistance (TCR's) of a variety of resistors responsive to changes in their pad lengths (widths) be small. In recent years, the sizes of the resistors have varied widely from a minimum of, say, 0.3×0.3 mm to a size of several millimeters square according to the designs of the devices. When such a resistor is combined with a Pd/Ag electrode or an Ag electrode, however, the resistor with a small length will pose the problem that the shape of the resulting print or the film thickness obtained will change, or Ag or the like will diffuse from the electrode into the resistor. This will cause changes in the resistance and TCR of the resistor thick film. Even if the resistance varies slightly, it can be adjusted to a predetermined value, by laser trimming which removes a part of the resistor thick film with laser. The TCR, once varied, cannot be adjusted actively. Therefore, it is desired that the degree to which TCR, rather than resistance, depends on the pad length of the resistor be low, namely the length effect be low. TCR includes hot TCR (HTCR) and cold TCR (CTCR), and it is preferred that both HTCR and CTCR have a low length effect.

Improvements, such as changing the formulation and the proportions of components of the thick film resistor composition, have been tried in order to reduce the length effect of the TCR. However, no satisfactory results have been obtained.

SUMMARY OF THE INVENTION

It is thus the object of the present invention to provide a thick film resistor composition having the TCR with a low length effect.

This object is achieved by incorporating 0.02–5.0 wt. % of silver into a thick film resistor composition containing at least one of an oxide of ruthenium and a ruthenium pyrochlore oxide as a conducting component.

The present invention will be described in more detail below.

DETAILED DESCRIPTION OF THE INVENTIONS

The thick film resistor composition of the present invention contains a conducting component, an inorganic binder and an organic medium (vehicle) as essential components, and further contains 0.02–5.0 wt. % of silver. Silver may be present in the thick film resistor composition in any form such as metallic silver (Ag), silver ions (Ag$^+$), or a silver compound (Ag$_2$O or the like). The thick film resistor composition of the present invention is produced by mixing a conducting component, an inorganic binder, and an organic medium, if desired with the addition of an inorganic additive. Silver may be incorporated at any stage during the production process for the composition. For example, silver may have been incorporated in the conducting component or in the inorganic binder. Alternatively, silver may be added as the inorganic additive to the thick film resistor composition. Furthermore, silver may be converted into an organometallic compound for incorporation into the organic medium. By using this silver-containing organic medium, silver can be incorporated in the thick film resistor composition. The joint use of these methods, i.e. the incorporation of silver into both of the glass and the organic medium, is also possible.

The presence of silver in the thick film resistor composition lessens the effect of the diffusion of the silver component from the electrode on the TCR of the resistor. It is presumed that this will contribute to improving the length effect of the TCR of the thick film resistor.

A. Conducting component

The thick film resistor composition of the present invention contains, as the conducting component, an oxide of ruthenium or a ruthenium pyrochlore oxide. The ruthenium pyrochlore oxide is a kind of pyrochlore oxide which is a multi-component compound of Ru$^{+4}$, Ir$^{+4}$ or a mixture of these (M"), said compound being expressed by the following general formula:

$$(M_xBi_{2-x})(M'_yM''_{2-y})_{7-z}$$

wherein

M is selected from the group consisting of yttrium, thallium, indium, cadmium, lead, copper and rare earth metals, M' is selected from the group consisting of platinum, titanium, chromium, rhodium and antimony, M" is ruthenium, iridium or a mixture thereof, x denotes 0 to 2 with a proviso that x≦1 for monovalent copper, y denotes 0 to 0.5 with the proviso that when M' is rhodium or two or more of platinum, titanium, chromium, rhodium and antimony, y stands for 0 to 1, and z denotes 0 to 1 with a proviso that when M is divalent lead or cadmium, z is at least equal to about x/2.

These ruthenium pyrochlore oxides are described in detail in the specification of U.S. Pat. No. 3,583,931.

The preferred ruthenium pyrochlore oxides are bismuth ruthenate ($Bi_2Ru_2O_7$) and lead ruthenate ($Pb_2Ru_2O_6$). These compounds are obtained easily in pure form, are not adversely affected by the glass binder, have relatively small TCR's, are stable even when heated to about 1000° C. in air, and are relatively stable even in a reducing atmosphere. More preferred is lead ruthenate ($Pb_2Ru_2O_6$). Other pyrochlores, $Pb_{1.5}Bi_{0.5}Ru_2O_{6.20}$ and $CdBiRu_2O_{6.5}$, may also be used. y=0 for all these pyrochlore compounds.

The oxide of ruthenium or the ruthenium pyrochlore oxide is used in a proportion of 10–50 wt. %, preferably 12–40 wt. %, based on the total weight of the composition containing the organic medium. If based on the total content of the inorganic solids, that proportion is 14–75 wt. %, preferably 17–57 wt. %. The total content of the inorganic solids refers to the total amount of the conducting component and the inorganic binder. In case the composition of the present invention contains an inorganic additive in addition to the conducting component and the inorganic binder, the total content of the inorganic solids is taken to contain said inorganic additive.

B. Inorganic binder

Various glasses that are generally used for thick film resistor compositions may be used as the inorganic binder in the thick film resistor composition of the present invention. That is, glasses containing 40–80 wt. % of PbO and 10–50 wt. % of $SiO_2$ in which the total content of PbO and $SiO_2$ is 60% or more may be used. They include, for example, lead silicate glass containing about 23–34 wt. % of $SiO_2$, and lead borosilicate glass containing about 23–34 wt. % of $SiO_2$, about 52–73 wt. % of PbO, and about 4–14 wt. % of $B_2O_3$. Examples of the formulations for glass that can be used as the inorganic binder in the present invention are shown in Tables 1 and 2. The examples of glass listed in these tables can be produced by an ordinary manufacturing method.

TABLE 1

| | Glass binder (wt. %) | | | | | | | | | |
|---|---|---|---|---|---|---|---|---|---|---|
| | No. 1 | No. 2 | No. 3 | No. 4 | No. 5 | No. 6 | No. 7 | No. 8 | No. 9 | No. 10 |
| $SiO_2$ | 28.8 | 29.0 | 23.5 | 25.9 | 34.0 | 26.0 | 25.0 | 24.0 | 24.0 | 35.5 |
| $ZrO_2$ | | | 4.0 | | | | 4.0 | 4.0 | 2.0 | |
| $TiO_2$ | | | | | | | | 4.0 | | |
| $B_2O_3$ | | | 25.4 | 10.0 | | 10.0 | 10.0 | 10.0 | 10.0 | 3.1 |
| $Al_2O_3$ | | | 6.4 | 2.5 | 1.0 | 2.5 | 1.0 | 2.5 | 2.5 | 1.2 |
| PbO | 71.2 | 69.0 | | 61.6 | 65.0 | 59.0 | 57.5 | 53.5 | 58.5 | 62.2 |
| BaO | | | 1.0 | | | | | | | |
| CaO | | | 4.0 | | | | | | | |
| ZnO | | | 27.2 | | | | | | | |
| $Li_2O$ | | 2.0 | | | | 2.0 | 2.0 | 2.0 | 3.0 | |
| $Na_2O$ | | | 8.5 | | | | | | | |

TABLE 2

| | Glass binder (mol %) | | | | | | | | | |
|---|---|---|---|---|---|---|---|---|---|---|
| | No. 1 | No. 2 | No. 3 | No. 4 | No. 5 | No. 6 | No. 7 | No. 8 | No. 9 | No. 10 |
| $SiO_2$ | 60.0 | 56.2 | 28.0 | 49.3 | 65.4 | 46.4 | 45.0 | 41.8 | 42.3 | 62.5 |
| $ZrO_2$ | | | 2.4 | | | | 3.6 | 3.5 | 1.7 | |
| $TiO_2$ | | | | | | | | 5.2 | | |
| $B_2O_3$ | | | 25.9 | 16.3 | | 15.3 | 15.4 | 14.9 | 15.1 | 4.9 |
| $Al_2O_3$ | | | 4.4 | 2.9 | 1.0 | 2.7 | 1.0 | 2.6 | 2.6 | 1.3 |
| PbO | 40.0 | 36.0 | | 31.5 | 33.6 | 28.4 | 27.8 | 25.0 | 27.7 | 31.3 |
| BaO | | | 0.5 | | | | | | | |
| CaO | | | 5.1 | | | | | | | |
| ZnO | | | 24.0 | | | | | | | |
| $Li_2O$ | | 7.8 | | | | 7.2 | 7.2 | 7.0 | 10.8 | |
| $Na_2O$ | | | 9.7 | | | | | | | |

In the thick film resistor composition of the present invention, the above-listed glasses can be used as the inorganic binder. If there is used a mixture of a first glass containing 30–60 wt. % of $SiO_2$, 5–30 wt. % of CaO, 1–40 wt. % of $B_2O_3$, 0–50 wt. % of PbO, and 0–20 wt. % of $Al_2O_3$, in which the total amount of the $SiO_2$, CaO, $B_2O_3$, PbO and $Al_2O_3$ accounts for 95 wt. % or more of the first glass, and a second glass comprising PbO-$SiO_2$ glass in which PbO accounts for at least 50 wt. % of the glass, more preferable effects can be obtained.

The first glass contains only up to 50 wt. % of lead oxide, and so it is generally a high softening point glass. The second glass contains at least 50 wt. % of lead oxide, and so it is generally a low softening point glass.

The first glass and the second glass each cannot be used alone as a glass binder for the thick film resistor composition, because the former glass does not sinter, while the latter is too soft as glass, making the resistor ill-shaped. By mixing such glasses so far considered unusable alone, the present invention has achieved a thick film resistor with a minimal length effect of TCR and with small changes in resistance and TCR due to calcination of the overcoat glass. This has been quite unpredictable.

The first glass is glass in which the total amount of $SiO_2$, CaO, $B_2O_3$, PbO and $Al_2O_3$ accounts for 95 wt. % or more of the glass. The amount of $SiO_2$ needs to be at least 30 wt. %. A smaller amount will result in the failure to obtain a sufficiently high softening point. However, the amount must be 60 wt. % or less. A larger amount than this may result in crystallized Si. The amount of CaO needs to be at least 5 wt. %, but has to be 30 wt. % or less. An amount in excess of 30 wt. % may cause Ca to be crystallized with other elements. The amount of $B_2O_3$ needs to be at least 1 wt. %, but should be 40 wt. % or less. An amount larger than it may lead to no glass formation. The amount of PbO must be 50 wt. % or less. An amount exceeding 50 wt. % will result in the failure to obtain a sufficiently high softening point. Preferably, it is 0–30 wt. %, more preferably 0–20 wt. %. The amount of $Al_2O_3$ must be 20 wt. % or less. An amount exceeding 20 wt. % will result in no glass formation. The preferred amount is 0–5 wt. %.

The first glass is used in a proportion of 5–35 wt. %, preferably 10–25 wt. %, based on the total weight of the composition containing the organic medium. If based on the total content of the inorganic solids, it is 7–50 wt. %, preferably 14–36 wt. %.

The second glass is $PbO$-$SiO_2$ glass with a PbO content of at least 50 wt. %. Only when the first glass is used in combination with the second glass, can the reduction of the length effect of the resistor TCR be achieved.

The second glass is preferably one containing 50–80 wt. % of PbO, 10–35 wt. % of $SiO_2$, 0–10 wt. % of $Al_2O_3$, 1–10 wt. % of $B_2O_3$, 1–10 wt. % of CuO, and 1–10 wt. % of ZnO, the total content of the PbO, $SiO_2$, $Al_2O_3$, $B_2O_3$, CuO and ZnO being 95 wt. % or more of the glass. By mixing the second glass of this formulation and the aforementioned first glass, the length effect of TCR and changes in resistance and TCR due to calcination of the overcoat glass are minimized, and the sintering properties are also improved.

The second glass is used in a proportion of 5–40 wt. %, preferably 10–35 wt. %, based on the total weight of the composition containing the organic medium. If based on the total content of the inorganic solids, it is 7–57 wt. %, preferably 14–50 wt. %.

The thick film resistor composition of the present invention may contain a third glass as a glass binder. The third glass is $PbO$-$SiO_2$ glass prepared such that its softening point is lower than that of the first glass, but higher than that of the second glass. For example, it has the formulation, 65.0 wt. % PbO, 34.0 wt. % $SiO_2$, and 1.0 wt. % $Al_2O_3$.

The third glass is used in a proportion of 0–30 wt. %, preferably 5–25 wt. %, based on the total weight of the composition containing the organic medium. If based on the total content of the inorganic solids, it is 0–43 wt. %, preferably 7–36 wt. %.

The glasses that are used as inorganic binders in the present invention, including the first, second and third glasses, may further contain less than 5 wt. % of components for regulating the thermal expansion coefficient of the thick film resistor and the maturing temperature of the glass binder. An ordinary substrate, 96% alumina ceramic, has a thermal expansion coefficient of $75 \times 10^{-7}/°C$. and so the thermal expansion coefficient of the thick film resistor should preferably be lower than that. The thermal expansion coefficient can be regulated by adjusting the contents of silica, lead oxide and boron oxide. The incorporation of a small amount of an oxide of lithium, potassium or sodium may result in a regulated thermal expansion coefficient. Lithium oxide is advantageously incorporated in the glass binder component to a content of about 3 wt. %. $ZrO_2$ in an amount of up to about 4% enhances the resistance of the glass to dissolution in an alkali solution, while $TiO_2$ enhances the resistance of the glass to attack by an acid. When the glass is PbO-free zinc aluminoborosilicate glass, the incorporation of $Na_2O$ can provide a favorable thermal expansion coefficient range.

The first, second and third glasses as inorganic binders can be produced by an ordinary glass manufacturing technique. Namely, they can be produced by mixing the desired components or their precursors, e.g. $H_3BO_3$ for $B_2O_3$, in the desired proportions, and heating the mixture to form a melt. As is well known in the art, the heating is performed to a peak temperature until the melt will become completely liquid and no gases will be generated. In the present invention, the peak temperature is in the range of from 1100° to 1500° C., usually from 1200° to 1400° C. Then, the melt is typically poured onto a cold belt or in cold running water for quenching. Then, the product is milled, if desired, to reduce its particle sizes.

More specifically, these glasses can be produced by melting for 20 minutes to 1 hour at about $1200°-1400°$ C. in a platinum crucible in a silicon carbide furnace electrically heated. By treatment with a rotary or oscillation mill, the final particle sizes can be adjusted to 1–10 $m^2/g$. The oscillation mill treatment is carried out by placing inorganic powder and cylinders of alumina, etc. together with an aqueous medium in a container, and then oscillating the container for a specified period of time.

When silver is to be incorporated in the inorganic binder, it is preferred to put $Ag_2O$ or $AgNO_3$ into the starting materials of glass as the inorganic binder during its production. In this case, the preferred amount of $Ag_2O$ or $AgNO_3$ is about 0.1 wt. % to about 10 wt. % of the glass, or about 0.02 wt. % to about 5 wt. % of the thick film resistor composition.

C. Inorganic additive

The thick film resistor composition of the present invention may further contain an inorganic additive such as $ZrSiO_4$ or a metallic oxide (e.g., MnO or $Nb_2O_5$). $ZrSiO_4$ contributes to improved laser trimming properties of the thick film resistor, while MnO and $Nb_2O_5$ contribute to a regulation of TCR. The inorganic additive is used in a proportion of 0–20 wt. % based on the total weight of the composition containing the organic medium, or 0–30 wt. % based on the total content of the inorganic solids.

When, in the present invention, silver is to be incorporated as an inorganic additive in addition to the conducting component or the inorganic binder, it is preferred to adopt a method in which a powder of metallic silver, a powder of $Ag_2O$ or a powder of $AgNO_3$ is mixed with the organic medium along with the conducting component and the inorganic binder. In this case, the amount of metallic silver, $Ag_2O$ or $AgNO_3$ is preferably about 0.02 wt. % to about 5 wt. % of the thick film resistor composition. The preferred metallic silver powder is spherical and has a particle size of 5 μm or less. The preferred particle size of $Ag_2O$ is also μm or less; that of $AgNO_3$ is likewise 5 μm or less.

D. Organic medium

These inorganic solids of the present invention are dispersed in the organic medium or vehicle to make a printable composition paste. The organic medium is used in a proportion of 20–40 wt. %, preferably 25–35 wt. %, based on the total weight of the composition.

Any inert liquids can be used as the vehicle. There may be used water or one of various organic liquids, the water or each liquid containing or not containing thickening agents and/or stabilizers and/or other ordinary additives. Examples of the organic liquids usable are aliphatic alcohols, esters (e.g., acetates and propionates) of such alcohols, terpenes such as pine root oil or terpineol, and solutions of resins (e.g., polymethacrylates of lower alcohols or ethyl cellulose) in solvents (e.g., pine root oil and monobutyl ether of ethylene glycol monoacetate). In the vehicle may be incorporated volatile liquids for promoting rapid solidification after application to the substrate. Alternatively, the vehicle may be composed of such volatile liquids. The preferred vehicle is based on ethyl cellulose and β-terpineol.

When silver is to be incorporated in the organic medium in the present invention, it is preferred to convert silver into an organometallic compound, such as a silver resinate, and incorporate it in the organic medium. The amount of the silver compound is preferably about 0.05 wt. % to about 12.5 wt. % of the organic medium or about 0.02 wt. % to about 5 wt. % of the thick film resistor composition.

E. Methods of preparation, application and testing

The thick film resistor composition of the present invention can be produced by means of, say, a triple roll mill.

The resistor composition of the present invention can be printed as a film on a ceramic, alumina or other dielectric substrate by an ordinary method. Advantageously, an alumina substrate is used, and the resistor composition is printed on a precalcined palladium-silver or silver terminal.

Generally, a screen stencil technique can be used preferably. The substrate with printed pattern is generally allowed to stand for leveling the printed pattern, and dried for about 10 minutes at an elevated temperature of, say, 150° C. Then, it is calcined at a peak temperature of about 850° C. in a belt furnace in air.

The following is a description of the testing methods for the various characteristics of the thick film resistor composition.

(1) Method of preparing a thick film resistor composition paste

Predetermined amounts of the inorganic solids and the vehicle are mixed, and the mixture is kneaded by a roll mill to make a paste.

(2) Printing and calcination

A Pd/Ag thick film conductor is printed on a 1 inch×1 inch (25 mm square) 96% alumina substrate to a dry film thickness of 18±2 μm, and is then dried for 10 minutes at 150° C. This Pd/Ag thick film conductor contains 0.5 wt. % of Pd in the paste.

Then, the thick film resistor composition paste is printed to a size of 0.2 mm×0.2 mm, 0.3 mm×0.3 mm, 0.8 mm×0.8 mm or 1.3 mm×1.3 mm. The thickness of the coating is such that the resulting dry film thickness will be 18±2 μm. The print is dried at 150° C. for 10 minutes, and then heated in a belt furnace for calcination. The temperature profile of the belt furnace is such that the peak temperature of about 850° C. is maintained for 10 minutes, followed by cooling. The calcination time is such, that the period from the time when the temperature during heating has exceeded 100° C. until the time when the temperature during cooling has become lower than 100° C. is 30 minutes.

(3) Measurement of resistance, HTCR and CTCR

The resistance (R) is measured with a terminal-patterned probe using an autorange autobalance digital ohmmeter with a precision of 0.01%. Specifically, samples are laid on the terminal post in the chamber, and electrically connected with the digital ohmmeter. The temperature in the chamber is adjusted to 25° C. and equilibrated. Then, each sample is measured for resistance, and the readings are recorded.

Then, the temperature in the chamber is raised to 125° C. or lowered to −55° C., and equilibrated. Then, each sample is measured again for resistance, and the readings are recorded.

HTCR and CTCR are calculated from the following equations:

$$HTCR = ((R_{125C} - R_{25C})/R_{25C}) \times 10000 \text{ ppm/°C}.$$

$$CTCR = ((R_{-55C} - R_{25C})/R_{25C}) \times 10000 \text{ ppm/°C}.$$

The length effect is evaluated by the difference in HTCR (ΔHTCR) and the difference in CTCR (ΔCTCR) between the two resistors of different sizes.

Embodiments $Pb_2Ru_2O_6$ for use as the conducting component in the Examples was prepared by reacting PbO and $RuO_2$ in air at 800°–1000° C., and then finely pulverizing the reaction product to obtain fine particles with surface areas of about 3–60 m²/g. In the Examples, the $RuO_2$ was one with a surface area of about 25 m²/g.

Six glasses (glasses A, B1 and B2, C, D1 and D2) for use as inorganic binders were produced by heat-melting the predetermined materials at 1000°–1700° C. for about 30 minutes to 5 hours depending on the formulation of the glass until the generation of gases would completely stop; then quenching the melt in water; and milling the quenched product to specific surface areas of about 2–5 m²/g. The formulations of these glasses are shown in Table 3. Glass A corresponds to the aforementioned first glass, glasses B1 and B2 to the second glass, and glass C to the third glass.

TABLE 3

| Kind of glass | Glass A | Glass B1 | Glass B2 | Glass C | Glass D1 | Glass D2 |
|---|---|---|---|---|---|---|
| PbO | — | 59.5 | 58.9 | 65.0 | 60 | 65 |
| $SiO_2$ | 55.0 | 29.5 | 29.2 | 34.0 | 32 | 26 |
| $Al_2O_3$ | 14.0 | 2.5 | 2.4 | 1.0 | 5 | 3 |
| $B_2O_3$ | 7.5 | 3.1 | 3.1 | — | 3 | 5 |
| CuO | — | 2.8 | 2.8 | — | — | — |
| ZnO | — | 2.6 | 2.6 | — | — | — |
| CaO | 21.5 | — | — | — | — | — |
| $TiO_2/Fe_2O_3$ | 0.5 | — | — | — | — | — |
| $M_2O$ M = K, Na | 0.5 | — | — | — | — | — |
| MgO | 1.0 | — | — | — | — | — |
| BaO | — | — | — | — | — | — |
| $ZrO_2$ | — | — | — | — | — | — |
| $Ag_2O$ | — | — | 1.0 | — | — | — |

The organic media used in the Examples were mixtures of 10–30 parts of ethyl cellulose and 90–70 parts of β-terpineol.

Embodiment 1

A composition containing a conventional ruthenium pyrochlore oxide ($Pb_2Ru_2O_6$) product (Example 1), and this composition containing Ag powder added thereto (Example 2) were prepared, and the resistors obtained using these compositions were examined for the length effect of TCR. The sizes of the resistors were 1.3 mm×1.3 mm and 0.2 mm×0.2 mm. The formulation of Example 1 is shown below. The formulation of Example 2 was such that 1 wt. % of spherical Ag powder with an average particle size of 1–2 μm was added to the composition of Example 1.

|  | Ex. 1 |
|---|---|
| $Pb_2Ru_2O_6$ | 29.0 wt. % |
| Glass D1 | 31.0 wt. % |
| Glass D2 | 8.0 wt. % |
| $ZrSiO_4$ | 5.0 wt. % |
| MnO | 0.2 wt. % |
| Organic medium | 26.8 wt. % |

The results of Examples 1 and 2 are revealed below. Here, the resistance of the resistor of the size 0.2 mm×0.2 mm was difficult to calculate as that of a thick film; therefore, it was not the sheet resistance, but the found value.

|  | Ex. 1 | Ex. 2 |
| --- | --- | --- |
| R (1.3 mm) | 2.41 kΩ | 1.28 kΩ |
| HTCR (1.3 mm) | +4 | +129 |
| CTCR (1.3 mm) | −72 | +77 |
| R (0.2 mm) | 2.20 kΩ | 1.60 kΩ |
| HTCR (0.2 mm) | +71 | +119 |
| CTCR (0.2 mm) | +4 | +73 |
| ΔHTCR (ppm/°C.) | +67 | −10 |
| ΔCTCR (ppm/°C.) | +76 | −4 |

Comparisons between Examples 1 and 2 show that both ΔHTCR and ΔCTCR become very small upon the addition of silver powder.

Embodiment 2

A composition containing a ruthenium oxide ($RuO_2$) and a ruthenium pyrochlore oxide ($Pb_2Ru_2O_6$) (Example 3), and this composition containing $AgO_2$ incorporated in one of the inorganic binder glasses thereof (Example 4) were prepared. The resistors obtained using these compositions were examined for the length effect of TCR. The sizes of the resistors were 0.8 mm×0.8 mm and 0.3 mm×0.3 mm. The formulations and results of measurements of Examples 3 and 4 are revealed below.

|  | Ex. 3 | Ex. 4 |
| --- | --- | --- |
| $RuO_2$ | 3.0 wt. % | 3.0 wt. % |
| $Pb_2Ru_2O_6$ | 17.0 wt. % | 17.0 wt. % |
| Glass A | 12.0 wt. % | 12.0 wt. % |
| Glass B1 | 20.0 wt. % | — |
| Glass B2 | — | 20.0 wt. % |
| Glass C | 16.8 wt. % | 16.8 wt. % |
| $Nb_2O_5$ | 1.2 wt. % | 1.2 wt. % |
| Organic medium | 30.0 wt. % | 30.0 wt. % |
| R (0.8 mm) | 30.9 kΩ | 31.0 kΩ |
| HTCR (0.8 mm) | +27 | +43 |
| CTCR (0.8 mm) | −52 | −27 |
| R (0.3 mm) | 23.4 kΩ | 25.2 kΩ |
| HTCR (0.3 mm) | +94 | +103 |
| CTCR (0.3 mm) | +41 | +52 |
| ΔR (%) | −24.3% | −18.7% |
| ΔHTCR (ppm/°C.) | +67 | +60 |
| ΔCTCR (ppm/°C.) | +93 | +79 |

Comparisons between Examples 3 and 4 show that all of ΔR, ΔHTCR and ΔCTCR become very small with the use of silver-containing glass (glass B2).

The sintered surface condition of the resulting resistor was not different between Examples 3 and 4. Hence, the present invention is understood to be capable of lessening the length effect of the TCR without changing the state of sintering of the resistor composition.

Embodiment 3

Ruthenium oxide ($RuO_2$)-containing compositions containing $AgO_2$ powder incorporated therein (Examples 5 and 6) were prepared. The resistors obtained using these compositions were examined for the length effect of TCR. The sizes of the resistors were 0.8 mm×0.8 mm and 0.3 mm×0.3 mm. The formulations and results of measurements of Examples 5 and 6 are revealed below. In both of Examples 5 and 6, ΔR, ΔHTCR and ΔCTCR were all small, demonstrating the effectiveness of the present invention.

|  | Ex. 5 | Ex. 6 |
| --- | --- | --- |
| $RuO_2$ | 20.0 wt. % | 20.0 wt. % |
| Glass A | 14.5 wt. % | 14.5 wt. % |
| Glass B1 | 19.0 wt. % | 19.0 wt. % |
| Glass C | 12.0 wt. % | 12.0 wt. % |
| $Nb_2O_5$ | 1.4 wt. % | 1.4 wt. % |
| $Ag_2O$ | 0.2 wt. % | 0.5 wt. % |
| Organic medium | 32.9 wt. % | 32.6 wt. % |
| R (0.8 mm) | 7.33 kΩ | 7.51 kΩ |
| HTCR (0.8 mm) | −13 | −9 |
| CTCR (0.8 mm) | −81 | −68 |
| R (0.3 mm) | 6.86 kΩ | 6.93 kΩ |
| HTCR (0.3 mm) | +11 | +20 |
| CTCR (0.3 mm) | −43 | −34 |
| ΔR (%) | −6.4% | −7.7% |
| ΔHTCR (ppm/°C.) | +24 | +29 |
| ΔCTCR (ppm/°C.) | +38 | +34 |

As has been described, the thick film resistor composition of the present invention gives a thick film resistor with a low length effect of TCR.

What is claimed is:

1. A thick film resistor composition comprising by weight, basis inorganic component (a) 14–75% wt. conductive compounds being expressed by the following general formula:

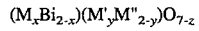

wherein

M is selected from the group consisting of yttrium, thallium, indium, cadmium, lead, copper, and rare earth metals, M' is selected from the group consisting of platinum, titanium, chromium, rhodium, and antimony, M" is ruthenium, iridium or a mixture thereof, x denotes 0 to 2 with a proviso that $x \leq 1$ for monovalent copper, y denotes 0 to 0.5 with the proviso that when M' is rhodium or two or more of platinum, titanium, chromium, rhodium, and antimony, y stands for 0 to 1, and z denotes 0 to 1 with a proviso that when M is divalent lead or cadmium, z is at least equal to about x/2; and (b) 86–25% wt. inorganic binder comprising 40–80 wt. % PbO, 10–50 wt. % $SiO_2$ wherein the total amount of PbO and/or $SiO_2$ exceeds or is equal to 60 wt. % of binder weight and 0.1–10 wt. % $Ag_2O$ or $AgNO_3$; and all of (a) and (b) dispersed in an organic medium.

2. The composition of claim 1 wherein the inorganic binder comprises (a) a first glass containing 30–60 wt. % $SiO_2$, 5–30 wt. % CaO, 1–40 wt. % $B_2O_3$, 0–50 wt. % PbO, and 0–20 wt. % $Al_2O_3$ in which the total amount of $SiO_2$, CaO, $B_2O_3$, PbO, and $Al_2O_3$ exceeds or is equal to 95 wt. % of the first glass and (b) a second glass comprising 50–80 wt. % PbO, 10–35 wt. % $SiO_2$, 0–10 wt. % $Al_2O_3$, 1–10 wt. % $B_2O_3$, 1–10 wt. % CuO, and 1–10 wt. % ZnO in which the total amount of PbO, $SiO_2$, $Al_2O_3$, $B_2O_3$, CuO and ZnO exceeds or is equal to 95 wt. % of the second glass and (c) 0.1–10 wt. % $Ag_2O$ or $AgNO_3$.

3. The glass of claim 2 further comprising a third glass comprising 65.0 wt. % PbO, 34.0 wt. % $SiO_2$ and 1.0 wt. % $Al_2O_3$.

4. The glass of claims 2 or 3 further comprising an oxide selected from the group consisting of lithium oxide, potassium oxide or sodium oxide.

* * * * *